Patented Dec. 22, 1942

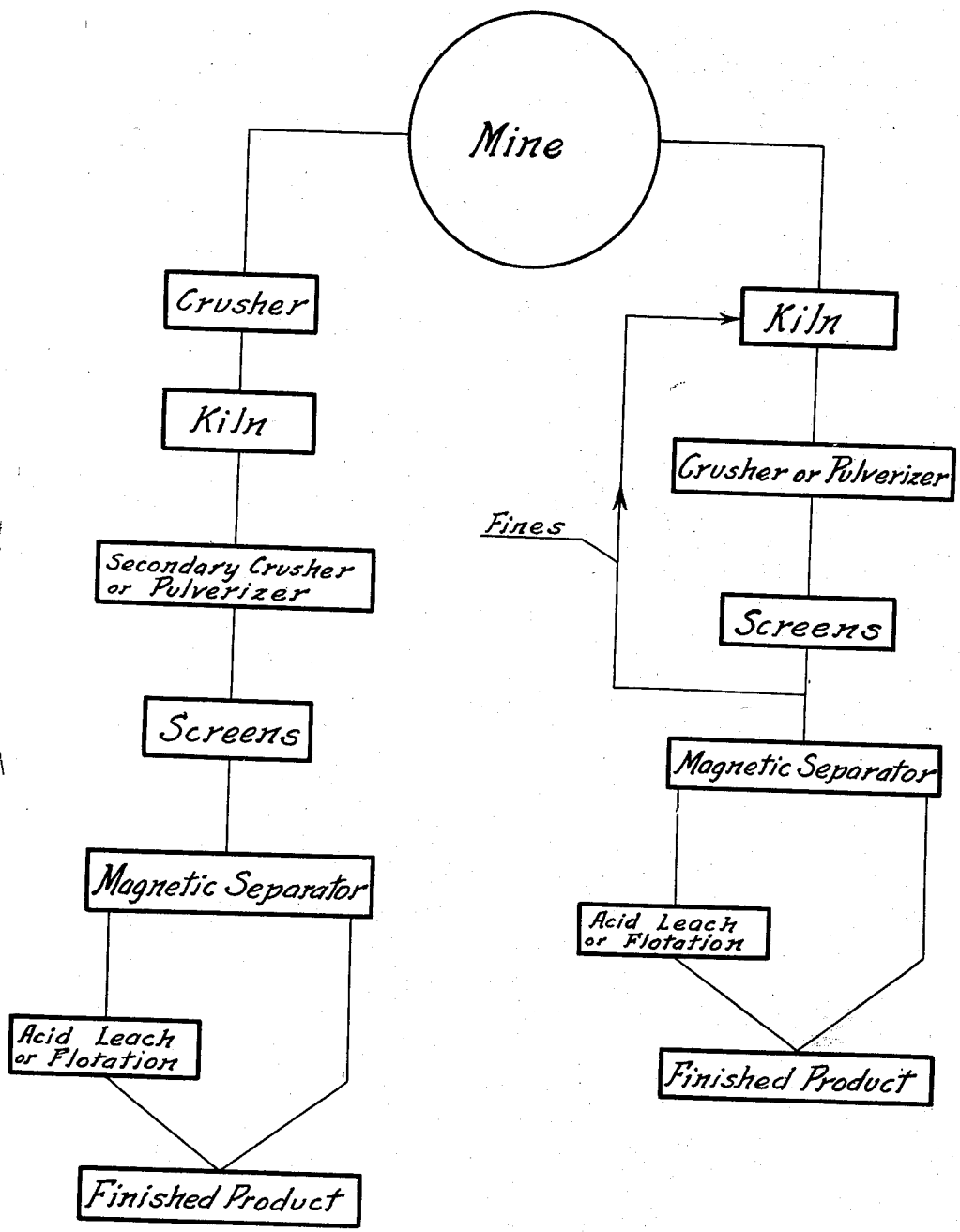

2,306,171

UNITED STATES PATENT OFFICE 2,306,171

PROCESS OF TREATING IRON-BEARING FELDSPATHIC MINERALS

Robert Wesley Lawson and Walter Frederick Deneen, Erwin, Tenn.

Application July 17, 1941, Serial No. 402,880

3 Claims. (Cl. 209—8)

This invention relates to a process of treating minerals to remove excessive iron bearing material therefrom.

More particularly, the invention comprises the treatment of feldspathic minerals such as aplite, pegmatite and nepheline-syenite by heating them to a temperature which causes them to vitrify, or to become semi-vitrified, prior to grinding and magnetic separation, thereby not only to effect a more complete removal of iron bearing material, but also to reduce wear on the equipment used in crushing, and to minimize dust.

It is an object which is achieved by this invention to treat aplite and other iron bearing feldspathic minerals with heat prior to magnetic separation or leaching thereby to effect a more complete removal of iron therefrom.

Another object is to provide a process for the treatment of such minerals wherein the mineral is heated to a temperature which renders it more friable and brittle and at the same time causes a coalescence which permits of ready access to the contained iron for magnetic separation.

Another object is to provide a process wherein dust which is injurious to the health of the workmen is kept to a minimum during operation.

Still another object is to provide a process wherein, because of preliminary heating of the material its friability is increased and its subsequent crushing causes less wear on the equipment used.

In furtherance of the aforestated objects and others which will be apparent from the description and drawing which is a flow sheet of our process:

Feldspar bearing minerals such as aplite, pegmatite, and nepheline-syenite contain an appreciable amount of iron which must be largely extracted to make the mineral acceptable to the glass and ceramic industries. The necessity for such removal has been recognized and in the past has been effected by crushing the mined mineral and extracting as much iron as possible by well-known magnetic separation procedures. The excessive fines resulting from crushing, however, so densely surrounded the iron particles that, being non-magnetic themselves, they served to insulate the iron and render its extraction difficult. Under favorable conditions in such processes the resulting product still contained as much as 0.25% iron.

By our process it is possible to reduce the iron content still further, to as little as 0.12% of the finished product. This we attribute to the preliminary heating of the mineral which causes it to break into larger fragments, with little dust which interferes with magnetic separation, and also which causes a coalescence of the mineral, or of the iron bearing material, or both, more sharply defining their characteristics and exposing the iron for more effective attraction in the magnetic separator.

The iron bearing mineral if too large as mined may be first reduced to a convenient size of approximately one-eighth of an inch or larger. It is then heated in a kiln which may be of any well-known type, and is there raised to a temperature which causes it to vitrify or become semi-vitrified. Depending upon the mineral under treatment, the temperature will range from 800° F. to 2426° F.

The vitrified mineral is next crushed and screened before magnetic separation, and if necessary or desired the fines are separately collected and compacted by dry pressing, briquetting, or by being put in slip form, and returned to the kiln for re-run, so that little waste results. Ordinarily, however, heat treated mineral of 10 or 20 mesh does not have to be cleaned of fines before magnetic separation in order that such separation may be effectively performed.

The screened and sized fragments then pass to a magnetic separator where the iron, being exposed and uninsulated by surrounding non-magnetic dust and fines, is separated from the heat treated mineral.

The resulting product may be sold to the trade without additional treatment, being in this form acceptable to the glass and ceramic industries, but it may be ground to a finer state, if desired, or it may be further purified by acid leaching or by flotation.

From foregoing it will be apparent that our process provides for an efficient separation of a large percentage of iron bearing material from feldspathic minerals, with little waste and dust, and with longer life of the crushing and sizing machinery.

What we claim as our invention, and desire to secure by Letters Patent, is:

1. The process of treating iron-bearing feldspathic minerals to remove excessive iron which comprises heating the mineral to a temperature which renders it readily friable, crushing and sizing the same, removing the fines, subjecting the sized fragments to magnetic separation, agglomerating and heating the fines, subjecting the material thereof to magnetic separation, and recovering its feldspathic values.

2. The process of treating aplite which comprises heating large sizes of mineral to from 800°

F. to 2426° F., crushing and sizing the mineral, collecting and agglomerating the fines and returning them with the feed to be heated, and magnetically separating iron from the sized material for recovery of its feldspathic values.

3. The process of treating aplite which comprises heating the mineral to from 800° F. to 2426° F., crushing and sizing the mineral, collecting and agglomerating the fines for reheating, magnetically separating iron from the sized material, and finally effecting a further separation by flotation of the separated material for recovery of its feldspathic values.

ROBERT WESLEY LAWSON.
WALTER FREDERICK DENEEN.